United States Patent
Smith et al.

(10) Patent No.: US 9,657,784 B2
(45) Date of Patent: May 23, 2017

(54) DOUBLE CLUTCH MOUNTING ASSEMBLY

(71) Applicant: Schaeffler Technologies AG & Co. KG, Herzogenaurach (DE)

(72) Inventors: David Smith, Wadsworth, OH (US); Phong Lu, Wooster, OH (US)

(73) Assignee: Schaeffler Technologies AG & Co. KG, Herogenaurach (DE)

( * ) Notice: Subject to any disclaimer, the term of this patent is extended or adjusted under 35 U.S.C. 154(b) by 0 days.

(21) Appl. No.: 14/630,548

(22) Filed: Feb. 24, 2015

(65) Prior Publication Data
US 2015/0240884 A1    Aug. 27, 2015

Related U.S. Application Data

(60) Provisional application No. 61/944,894, filed on Feb. 26, 2014.

(51) Int. Cl.
| | | |
|---|---|---|
| *F16D 21/06* | (2006.01) | |
| *F16D 13/70* | (2006.01) | |
| *F16D 25/08* | (2006.01) | |

(52) U.S. Cl.
CPC ............ *F16D 21/06* (2013.01); *F16D 25/083* (2013.01); *F16D 2013/703* (2013.01); *F16D 2021/0607* (2013.01); *F16D 2021/0669* (2013.01); *F16D 2300/12* (2013.01); *Y02T 10/76* (2013.01); *Y10T 29/49826* (2015.01)

(58) Field of Classification Search
None
See application file for complete search history.

(56) References Cited

U.S. PATENT DOCUMENTS

| | | |
|---|---|---|
| 7,686,147 B2 | 3/2010 | Friedmann et al. |
| 2005/0034955 A1 | 2/2005 | Meinhard et al. |
| 2006/0021842 A1 | 2/2006 | Berhan |
| 2006/0289263 A1 | 12/2006 | Friedmann et al. |
| 2011/0079481 A1 | 4/2011 | Carey et al. |
| 2011/0088989 A1* | 4/2011 | Agner ............... F16D 3/12 192/48.601 |
| 2012/0325610 A1 | 12/2012 | Krebs et al. |

FOREIGN PATENT DOCUMENTS

| | | | |
|---|---|---|---|
| FR | 2851547 | * | 2/2003 |
| WO | WO 2012/152243 | | 11/2012 |

OTHER PUBLICATIONS

International Search Report and Written Opinion pf Corresponding PCT/US2015/017387.

* cited by examiner

*Primary Examiner* — Mark Manley
(74) *Attorney, Agent, or Firm* — Davidson, Davidson & Kappel, LLC

(57) ABSTRACT

A double clutch mounting assembly for a motor vehicle drive train is provided. The double clutch mounting assembly includes a double clutch; a damper configured for connecting the double clutch to an engine crankshaft; and a clutch actuator for actuating the double clutch fixed to the double clutch. One of the double clutch and the damper includes a pilot configured for insertion into an engine crankshaft to center the double clutch, damper and clutch actuator with respect to the engine crankshaft. A method of forming a double clutch mounting assembly is also provided. The method includes forming a subassembly by axially fixing a dual mass flywheel and a double clutch together and axially fixing a concentric slave cylinder to the double clutch.

9 Claims, 2 Drawing Sheets

DOUBLE CLUTCH MOUNTING ASSEMBLY

This claims the benefit to U.S. Provisional Patent Application No. 61/944,894, filed on Feb. 26, 2014, which is hereby incorporated by reference herein.

The present disclosure relates generally to double clutches and more specifically to double clutch mounting assemblies.

BACKGROUND

U.S. Pat. No. 7,686,147 discloses a torque transmission device in a drive train of a vehicle including a dual mass flywheel ("DMFW") flange fixed to a crankshaft and a central plate centered on a transmission shaft by a bearing. An expensive, no-lash spline connection is used to join the DMFW to the double clutch due to double centering.

WO 2012/152243 also discloses a torque transmission device in a drive train of a vehicle.

SUMMARY OF THE INVENTION

A double clutch mounting assembly for a motor vehicle drive train is provided. The double clutch mounting assembly includes a double clutch; a damper configured for connecting the double clutch to an engine crankshaft; and a clutch actuator for actuating the double clutch fixed to the double clutch. One of the double clutch and the damper includes a pilot configured for insertion into an engine crankshaft to center the double clutch, damper and clutch actuator with respect to the engine crankshaft.

A method of forming a double clutch mounting assembly is also provided. The method includes forming a subassembly by axially fixing a dual mass flywheel and a double clutch together and axially fixing a concentric slave cylinder to the double clutch.

BRIEF DESCRIPTION OF THE DRAWINGS

The present invention is described below by reference to the following drawings, in which.

DETAILED DESCRIPTION

Figure 1:
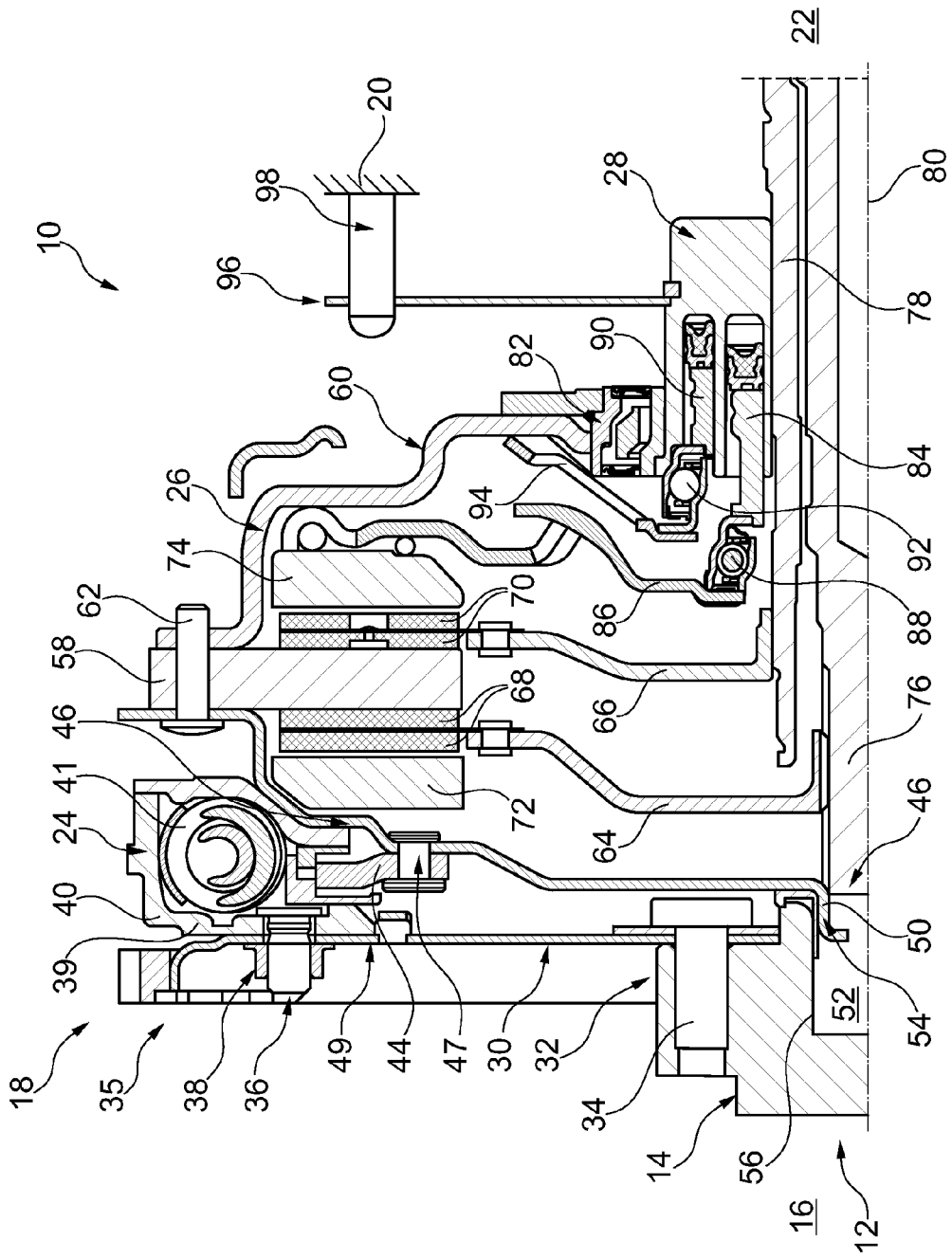
FIG. 1 shows a motor vehicle drive train including a double clutch mounting assembly in accordance with an embodiment of the present invention.

FIG. 1 shows a motor vehicle drive train 10 including a double clutch mounting assembly 12 in accordance with an embodiment of the present invention. Double clutch mounting assembly 12 includes a crankshaft 14 of an internal combustion engine 16, a torque transmission device formed by a subassembly 18 and a housing 20 of a transmission 22. Subassembly 18 transfers torque from crankshaft 14 to transmission 22 and includes a vibration damper, in the form of a DMFW 24, a double clutch 26 and a clutch actuator, in the form of concentric slave cylinder 28.

DMFW 24 is fixed to crankshaft 14 by a flexplate 30, which is fixed at an inner radial end 32 to crankshaft 14 by a fastener 34 and is fixed at a radial outer end 35 to DMFW 24 by a stud 36 and a nut 38. Specifically, an input flange 39 of a cover 40 of DMFW 24 is fixed to flexplate 30. Cover 40 surrounds a plurality of energy stores, which are formed by a plurality of circumferentially spaced springs 41. Springs 41 transfer torque from input flange 39 to an output flange 44 of DMFW 24, which in turn is axially fixed to a hinge ring 46 of double clutch 26 by a rivet 47. Flexplate 30 is also provided with a centering feature 49 that engages an inner radial surface of input flange 39 to center DMFW 24 with respect to flexplate 30 and crankshaft 14. Hinge ring 46 forms a front cover plate of double clutch 26 and centers double clutch 26 with respect to crankshaft 14. Specifically, at an inner radial end of hinge ring 46, hinge ring 46 includes an axial extension 50 that protrudes axially away from double clutch 26 and toward crankshaft 14 into a cavity 52 in crankshaft 14 to form a pilot 54. Additionally, an optional pilot piece 55 may be provided between pilot 54 and crankshaft 14 in contact with an inner surface 56 of crankshaft 14 in cavity 52 to center hinge ring 46 on crankshaft 14. Alternatively, pilot 54 may be in contact with an inner surface 56 of crankshaft 14 in cavity 52 to center hinge ring 46 on crankshaft 14. Radially outside of rivet 47 connecting hinge ring 46 and output flange 44, hinge ring 46 is fixed to an intermediate pressure plate 58 and a rear cover plate 60 of double clutch 26 by a fastener 62, with intermediate pressure plate 58 being sandwiched between hinge plate 46 and rear cover plate 60.

Inside of hinge ring 46 and cover plates 60, double clutch 26 includes a first and second clutch discs 64, 66 including respective friction surfaces 68, 70. Friction surfaces 68 may be clamped between an input side pressure plate 72 and intermediate pressure plate 58 and frictions surfaces 70 may be clamped between a transmission side pressure plate 74 and intermediate pressure 58. First clutch disc 64 includes an inner splined surface for nonrotatably connecting to an outer splined surface of an inner transmission shaft 76 and second clutch disc 66 includes an inner splined surface for nonrotatably connecting to an outer splined surface of an outer transmission shaft 78, which is hollow and positioned concentrically outside of inner transmission shaft 76. Crankshaft 14 and transmission shafts 76, 76 are aligned to be rotatable about a same center axis 80.

Concentric slave cylinder 28 is connected to rear cover plate 60 of double clutch 26 by a cover bearing 82 such that rear cover plate 60 is rotatable with respect to concentric slave cylinder 28. Concentric slave cylinder 28 is formed as a dual cylinder including an annular inner piston 84, which is connected to an actuating lever 86 by a release bearing 88, and annular outer piston 90, which is connected to an actuating lever 94 by a release bearing 92, for actuating double clutch 26. A centering strap 96 is further connected to concentric slave cylinder 28 for fixing subassembly 18 to bell housing 20 of transmission 22. Subassembly 18 is fixed to bell housing 20 by placing centering strap 96 onto pins 98.

Subassembly 18 may be assembled together for storage or transport before being mounted on crankshaft 14 and transmission bell housing 20. DMFW 24 may be constructed and axially fixed to double clutch 26 by riveting output flange 44 to hinge plate 46. Double clutch 26 and concentric slave cylinder 28 may be connected by fixing cover plate 60 of double clutch 26 to an outer radial surface of concentric slave cylinder 28 via cover bearing 82. After subassembly 18 is constructed, subassembly 18 may be tested and shipped out as a unit before connection to crankshaft 14 and transmission housing 20. Prior to transmission 22 being mated to engine 16 by subassembly 18, flex plate 30 is installed on crankshaft 14. To connect subassembly 18 to crankshaft 14, the input end of subassembly 18 may be aligned with crankshaft 14 by inserting hinge ring pilot 54 into cavity 52 of crankshaft 14 and aligning cover 40, at the inner radial surface of input flange 44, with centering feature 49 of flexplate. DMFW 24 may then be fixed to flex plate 30. To connect subassembly to transmission housing 20, the transmission side end of subassembly 18 may also be slid into transmission bell housing 20 and holes in centering strap 96 may be aligned with two or more pins 98 at a base of bell housing 20. After transmission 22 and engine 16 are mated by subassembly 18, concentric slave cylinder lines may then be connected to a hydraulic or hydrostatic power source.

Figure 2:
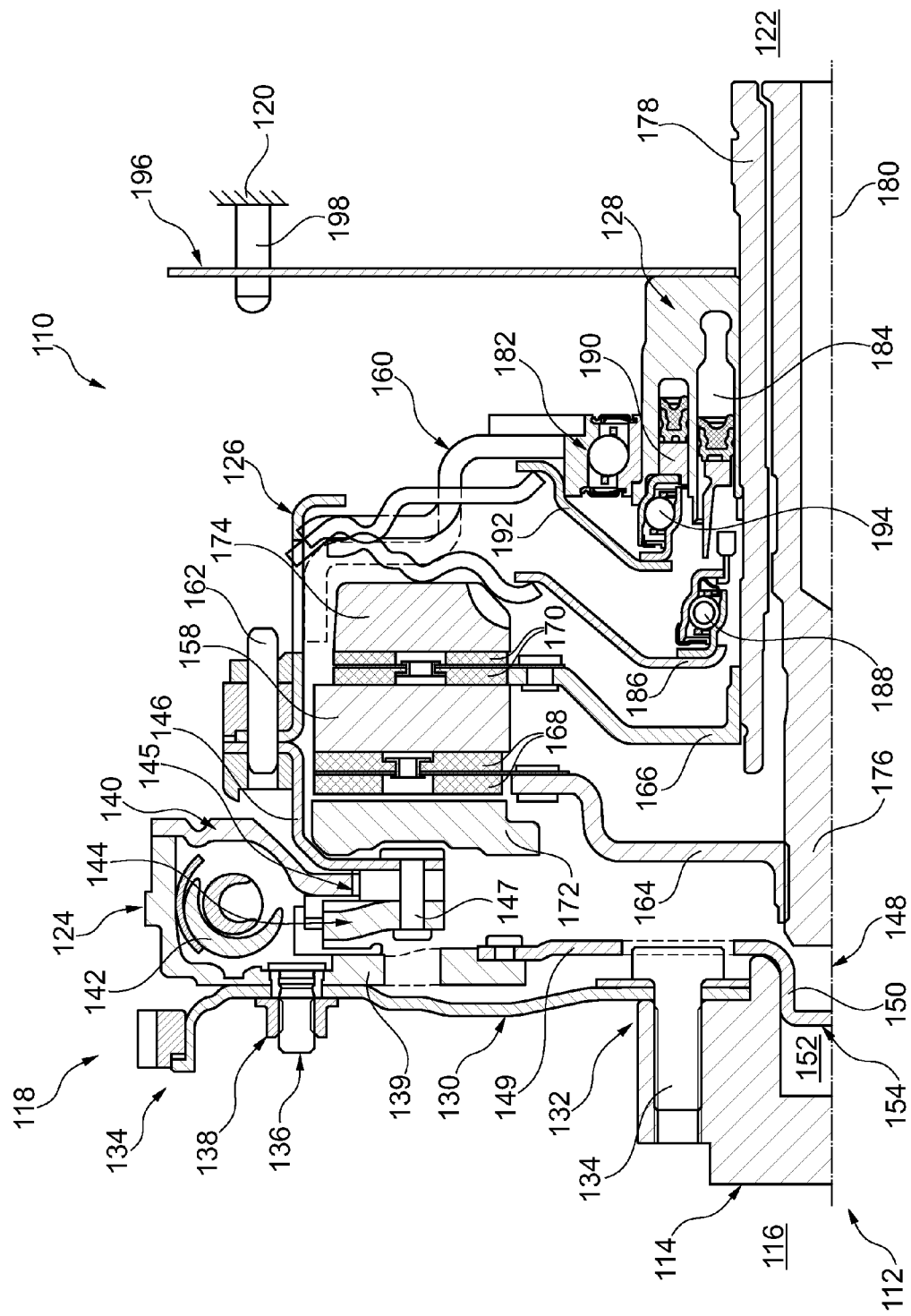
FIG. 2 shows a motor vehicle drive train including a double clutch mounting assembly in accordance with another embodiment of the present invention.

FIG. 2 shows a motor vehicle drive train 110 including a double clutch mounting assembly 112 in accordance with another embodiment of the present invention. Double clutch mounting assembly 112 includes a crankshaft 114 of an internal combustion engine 116, a torque transmission device formed by a subassembly 118 and a housing 120 of a transmission 122. Subassembly 118 transfers torque from crankshaft 114 to transmission 122 and includes a vibration damper, in the form of a DMFW 124, a double clutch 126 and a concentric slave cylinder 128.

DMFW 124 is fixed to crankshaft 114 by a flexplate 130, which is fixed at an inner radial end 132 to crankshaft 114 by a fastener 134 and is fixed at a radial outer end 135 to DMFW 124 by a stud 136 and a nut 138. Specifically, an input flange 139 of a cover 140 of DMFW 124 is fixed to flexplate 130. Cover 140 surrounds a plurality of energy stores, which are formed by a plurality of circumferentially spaced springs 142. Springs 142 transfer torque from input flange 139 to an output flange 144 of DMFW 124, which in turn is axially fixed to a cover plate 146 of double clutch 126 by a centering bushing 145 axially sandwiched between output flange 144 and cover plate 146 and rivet 147 passing through output flange 144, centering bushing 145 and cover plate 146. Input flange 139 is axially and radially fixed to a pilot plate 149 that centers double clutch 126 with respect to crankshaft 114. Specifically, at an inner radial end 148 of pilot plate 149, pilot plate 149 includes a pilot 154 formed by an axial extension 150 that protrudes axially away from double clutch 126 and toward crankshaft 114 into a cavity 152 in crankshaft 114. Radially outside of rivet 147 connecting output flange 144 and cover plate 146, cover plate 146 is fixed to an intermediate pressure plate 158 and a rear cover plate 160 of double clutch 126 by a fastener 162.

Inside of cover plates 146, 160, double clutch 26 includes a first and second clutch discs 164, 166 including respective friction surfaces 168, 170. Friction surfaces 168 may be clamped between an input side pressure plate 172 and intermediate pressure plate 158 and frictions surfaces 170 may be clamped between a transmission side pressure plate 174 and intermediate pressure 158. First clutch disc 164 includes an inner splined surface for nonrotatably connecting to an outer splined surface of an inner transmission shaft 176 and second clutch disc 166 includes an inner splined surface for nonrotatably connecting to an outer splined surface of an outer transmission shaft 178, which is hollow and positioned concentrically outside of inner transmission shaft 176. Crankshaft 114 and transmission shafts 176, 176 are aligned to rotatable about a same center axis 180.

Concentric slave cylinder 128 is connected to rear cover plate 160 of double clutch 126 by a cover bearing 182 such that rear cover plate 160 is rotatable with respect to concentric slave cylinder 128. Concentric slave cylinder 128 is formed as a dual cylinder including an annular inner piston 184, which is connected to an actuating lever 186 by a release bearing 188, and annular outer piston 190, which is connected to an actuating lever 192 by a release bearing 194, for actuating double clutch 126. A centering strap 196 is further connected to concentric slave cylinder 128 for fixing subassembly 118 to bell housing 120 of transmission 122.

Subassembly 118 is fixed to bell housing 120 by placing centering strap 196 onto pins 198.

Subassembly 118 may be assembled together for storage or transport before being mounted on crankshaft 114 and transmission bell housing 120. DMFW 124 may be constructed and fixed to double clutch 126 by riveting output flange 144 to centering bushing 145 and cover plate 146. Double clutch 126 and concentric slave cylinder 128 may be connected by fixing cover plate 160 of double clutch 126 to an outer radial surface of concentric slave cylinder 128 via cover bearing 182. After subassembly 118 is constructed, subassembly 118 may be tested and shipped out as a unit before connection to crankshaft 114 and transmission housing 120. Prior to transmission 122 being mated to engine 116 by subassembly 118, flex plate 130 is installed on crankshaft 114. To connect subassembly 118 to crankshaft 114, the input end of subassembly 118 may be aligned with crankshaft 114 by inserting pilot 154 of pilot plate 149 into cavity 152 of crankshaft 114. DMFW 124 may then be fixed to flywheel 130. To connect subassembly to transmission housing 120, the transmission side end of subassembly 118 may also be slid into transmission bell housing 120 and holes in centering strap 196 may be aligned with two or more pins 198 at a base of bell housing 120. After transmission 122 and engine 116 are mated by subassembly 118, concentric slave cylinder lines may then be connected to a hydraulic or hydrostatic power source.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A double clutch assembly for a motor vehicle drive train comprising:
   a double clutch including a hinge ring forming a pilot configured for insertion into a cavity of an engine crankshaft for centering the double clutch assembly, the double clutch including a common pressure plate and two single clutch discs;
   a damper fixed to the double clutch hinge ring and including a flexplate fastener arranged for removably connecting the damper to the flexplate of the engine crankshaft; and
   a clutch actuator fixed to the double clutch for independently actuating the each of the two single clutch discs against the common pressure plate,
   the double clutch including a rear cover, the hinge ring being fixed to the rear cover by rear cover fasteners, the hinge ring being a single piece extending from the pilot to the rear cover fasteners, the hinge ring being axially fixed to a torque output of the damper by torque output fasteners passing through the torque output such that the double clutch and the damper are installable together on the flexplate by the flexplate fastener.

2. The double clutch assembly as recited in claim 1 wherein the pilot is formed by an axial extension at a radially inner end of the hinge ring, the axial extension being centerable on an inner surface of the engine crankshaft.

3. The double clutch assembly as recited in claim 1 wherein the clutch actuator includes a concentric slave cylinder for actuating the double clutch, the concentric slave cylinder being connected to the rear cover.

4. The double clutch assembly as recited in claim 3 further comprising a cover bearing connecting the concentric slave cylinder to the rear cover.

5. The double clutch assembly as recited in claim 1 wherein the torque output fasteners are rivets.

6. The double clutch assembly as recited in claim 1 further comprising the flexplate configured for centering the damper on an engine crankshaft and connecting the damper to the engine crankshaft.

7. The double clutch assembly as recited in claim 1 further comprising a centering strap connected to the clutch actuator configured for connecting the clutch actuator to a transmission housing to center the double clutch, damper and clutch actuator with respect to the transmission housing.

8. The double clutch assembly as recited in claim 1 wherein the damper is a dual mass flywheel.

9. A motor vehicle drive train comprising:
the double clutch assembly as recited in claim 1, the double clutch assembly further including a centering strap connected to the clutch actuator and the flexplate connected to the damper;
the engine crankshaft fixed to the flexplate; and
a transmission including a housing, the clutch actuator being fixed to the housing by the centering strap.

* * * * *